United States Patent
Nakajima et al.

(10) Patent No.: US 8,243,205 B2
(45) Date of Patent: Aug. 14, 2012

(54) TELEVISION RECEIVING SYSTEM

(75) Inventors: Nobuo Nakajima, Tokyo (JP); Koichi Gyoda, Tokyo (JP); Eiji Shibuya, Kobe (JP); Takehiro Onomatsu, Osaka (JP); Hideto Yoshimura, Osaka (JP)

(73) Assignees: Funai Electric Co., Ltd., Daito-shi, Osaka (JP); The University of Electro-Communications, Choufu-shi, Tokyo (JP)

( * ) Notice: Subject to any disclaimer, the term of this patent is extended or adjusted under 35 U.S.C. 154(b) by 1101 days.

(21) Appl. No.: 12/156,382

(22) Filed: May 31, 2008

(65) Prior Publication Data

US 2008/0309826 A1     Dec. 18, 2008

(30) Foreign Application Priority Data

Jun. 15, 2007   (JP) .................................. 2007-158681

(51) Int. Cl.
*H04N 5/44*   (2011.01)
(52) U.S. Cl. ......... 348/725; 348/836; 343/700; 343/725
(58) Field of Classification Search .................. 345/725; 343/700, 725; 348/725, 836
See application file for complete search history.

(56) References Cited

U.S. PATENT DOCUMENTS

| | | | |
|---|---|---|---|
| 4,253,099 A * | 2/1981 | Yamazaki et al. | 343/713 |
| 7,057,558 B2 * | 6/2006 | Fukushima et al. | 343/700 MS |
| 2007/0024507 A1 * | 2/2007 | Kasamatsu et al. | 343/702 |
| 2008/0012994 A1 * | 1/2008 | Onomatsu | 348/725 |

FOREIGN PATENT DOCUMENTS

| | | |
|---|---|---|
| JP | H01-311702 A | 12/1989 |
| JP | H07-240626 A | 9/1995 |
| JP | 2003-018038 A | 1/2003 |
| JP | 2005-354631 A | 12/2005 |

OTHER PUBLICATIONS

Japanese Notice of the reason for refusal, dated Apr. 24, 2012.

* cited by examiner

*Primary Examiner* — Joseph P Hirl
*Assistant Examiner* — Jivka Rabovianski
(74) *Attorney, Agent, or Firm* — Yokoi & Co., U.S.A., Inc.; Toshiyuki Yokoi

(57) ABSTRACT

The present invention discloses a television receiving system comprising: a smart antenna having a receiving unit that electrically switches directions of receiving television broadcasting signals and a connecting portion that is detachably connected to the receiving unit; and a television receiver couple with the receiving unit though the connecting portion and having a holding portion that holds the receiving unit detached from the connecting portion on a rear surface of the television receiver where is opposite to a front surface displaying videos.

6 Claims, 9 Drawing Sheets

TELEVISION RECEIVING SYSTEM

CROSS-REFERENCES TO RELATED APPLICATIONS

The present application is related to the Japanese Patent Application No. 2007-158681, filed Jun. 15, 2007, the entire disclosure of which is expressly incorporated by reference herein.

BACKGROUND OF THE INVENTION (1) Field of the Invention

The present invention relates to a television receiving system, especially relates to an antenna that is capable of switching directivity.

(2) Description of the Related Art

A receiving device is disclosed in Japan patent publication No. 2003-18038. The receiving device uses an antenna to receive television broadcasting signals. Users were adjusting a physical direction of an antenna in order to make a directivity of the antenna optimal for receiving television broadcasting signals by the antenna. However this adjusting method had a problem that this adjusting method was very difficult. So, for example, an antenna system having an indicator indicating a receiving condition of television broadcasting signals in order to manually adjust the physical direction of the antenna existed. Another antenna system that automatically adjusted the physical direction of the antenna upon user's request existed.

Further an antenna (so-called "smart antenna") that can automatically change the direction of the antenna every time preferable channels are instructed by users is suggested. FIG. 9 is a perspective view of the smart antenna 1. According to this figure, the smart antenna 1 is comprised of an antenna unit 2 with receiving element, a chassis 3 holding the antenna unit 2, shaft portion 4 supporting the chassis 3 at a predetermined height and fixing the chassis 3 to a television receiving device, and a wiring wired from the antenna unit 2 and electrically connected to the television receiving device. According to this configuration, the smart antenna 1 is controlled by the television receiving device based on a predetermined standard through the wiring and changes the directivity.

In case storing the smart antennas that are disused, problems mentioned below are occurred. The smart antennas can be used for compact television receivers because the smart antennas have very high receiving sensitivity and are in compact shapes. The smart antennas detached have to be strictly protected from damages by impacts. Therefore, it is hard to deal with the smart antenna 1 detached from the television receiving device.

In Japan patent publication No. H07-240626A, storing method of antennas that spread comparatively large reflecting surfaces such like parabola antennas. The reflecting surfaces can be divided and folded. Therefore, it is possible to make the parabola antennas compact by folding the reflecting surfaces, when the parabola antennas are stored.

A problem mentioned below occurs in case applying the method disclosed in Japan patent publication No. H07-240626A for the smart antennas. That is, the method is unsuitable for small antennas such like the smart antennas. Further, folding the smart antennas is difficult because chassis of the smart antennas must contain active antenna units.

BRIEF SUMMARY OF THE INVENTION

The present invention includes a television receiving system, comprising:

a smart antenna having a receiving unit that electrically switches directions for receiving television broadcasting signals and a connecting portion that is detachably coupled with the receiving unit; and a television receiver coupled with the receiving unit though the connecting portion and having a holding portion that holds the receiving unit detached from the connecting portion on a rear surface of the television receiver, which is opposite to a front surface displaying videos.

These and other features, aspects, and advantages of invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and the drawings are to be used not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Here, embodiments of the present invention are explained, according to the following order.

A. a configuration of a television receiving system

A1. a configuration of the smart antenna

A1.1. a configuration of a chassis

A1.2. a configuration of an antenna unit

A1.3. a configuration of a shaft portion

A2. a configuration of a television receiver
    A2.1. a holding method of a receiving portion
    A2.2. another embodiment
B. Summary of the embodiments A. A Configuration of a Television Receiving System Here, a smart antenna and a television receiving system including the smart antenna of the best embodiment according to the present invention are explained in detail below with referencing to FIGS. 1 to 6. As well, a scope of the present invention should not be recognized to be limited to exemplary drawings.

Figure 1:
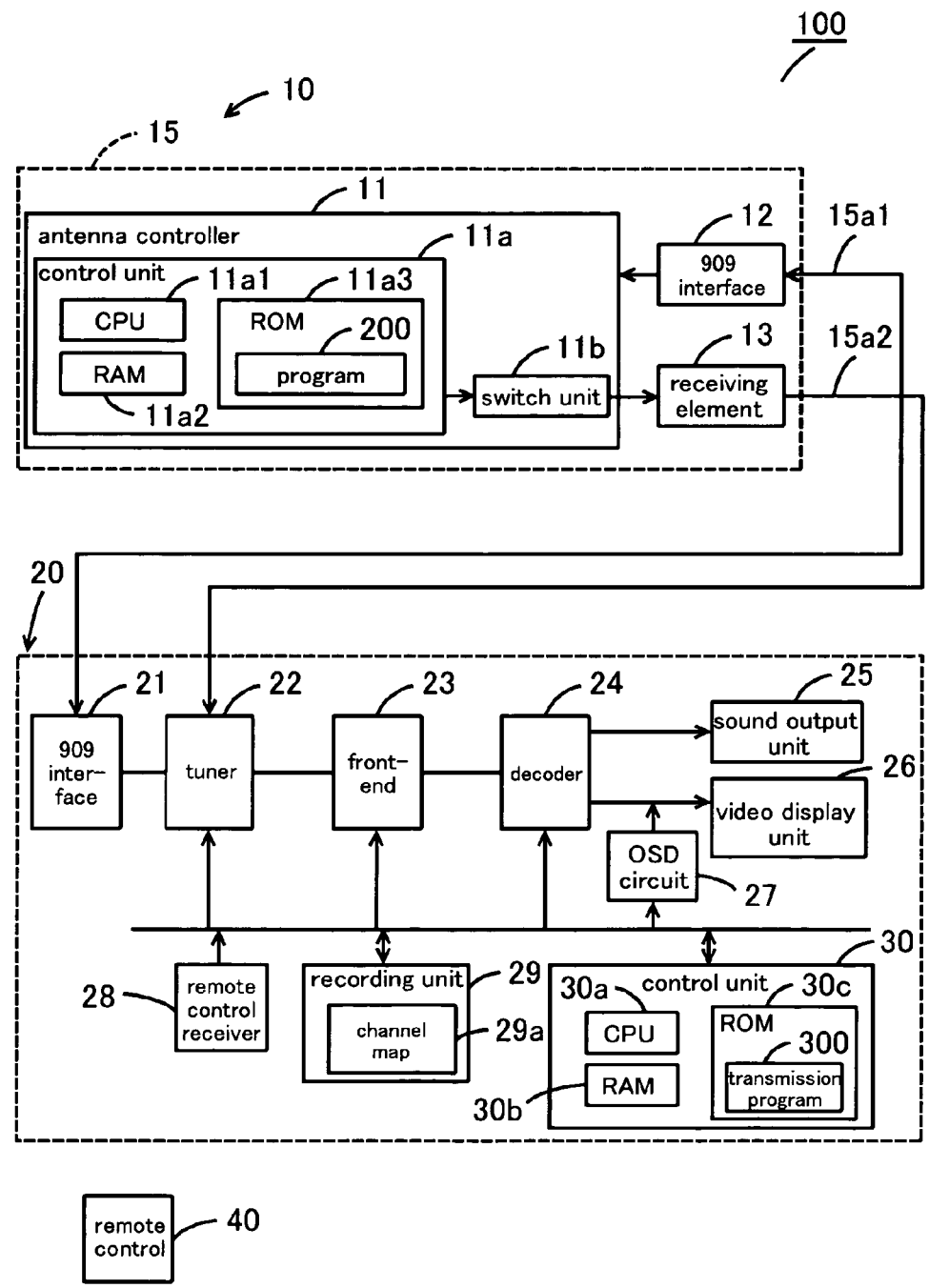
FIG. 1 is a block diagram showing a television receiving system of an embodiment of the invention.

FIG. 1 is a block diagram showing the television receiving system 100 of the present embodiment of the present invention. According to FIG. 1, the television receiving system 100 has a configuration including the smart antenna 10 and a television receiver 20. For receiving television broadcasting signals, the smart antenna 10 is attached to the television receiver 20. And the smart antenna 10 and the television receiver 20 are connected through an interface complying with a predetermined communication standard (EIA/CEA-909 e.g.) to communicate each other. The smart antenna 10 is configured to receive the television broadcasting signals e.g. and the television receiver 20 is configured to output sounds and videos that are based on the television broadcasting signals e.g. received by the smart antenna 10.

Figure 2:
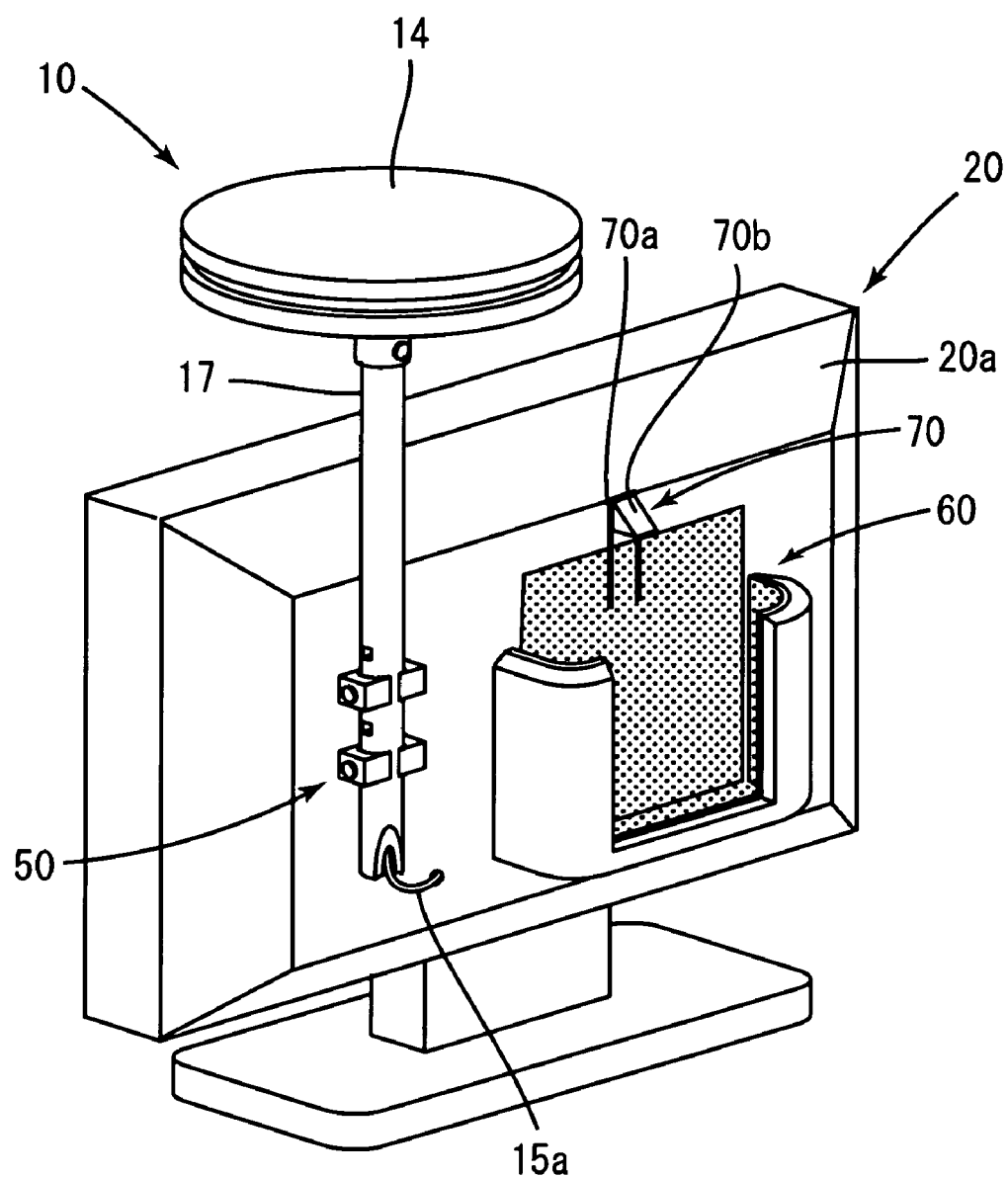
FIG. 2 is a perspective view showing a smart antenna being fixed to a television receiver.

FIG. 2 a perspective view showing a smart antenna 10 being fixed to a television receiver 20. In case the television receiving system 100 receives the television broadcasting signals, the smart antenna 10 is fixed to a fixing portion formed on a rear surface of the television receiver 20. And the smart antenna 10 is connected to the television receiver 20 thorough a wiring 15a. In particular, the television broadcasting signals received by the smart antenna 10 is output to the television receiver 20 through the wiring 15a. The smart antenna 10 of the present invention is capable of being divided into a chassis 14 (receiving unit) containing an antenna unit and a shaft portion 17 (connecting unit) for connecting the chassis 14 and the television receiver 20. The chassis 14 detached from the shaft portion 17 can be held by a holding portion 60 formed on the rear surface of the television receiver 20.

A1. A Configuration of the Smart Antenna

Figure 3:
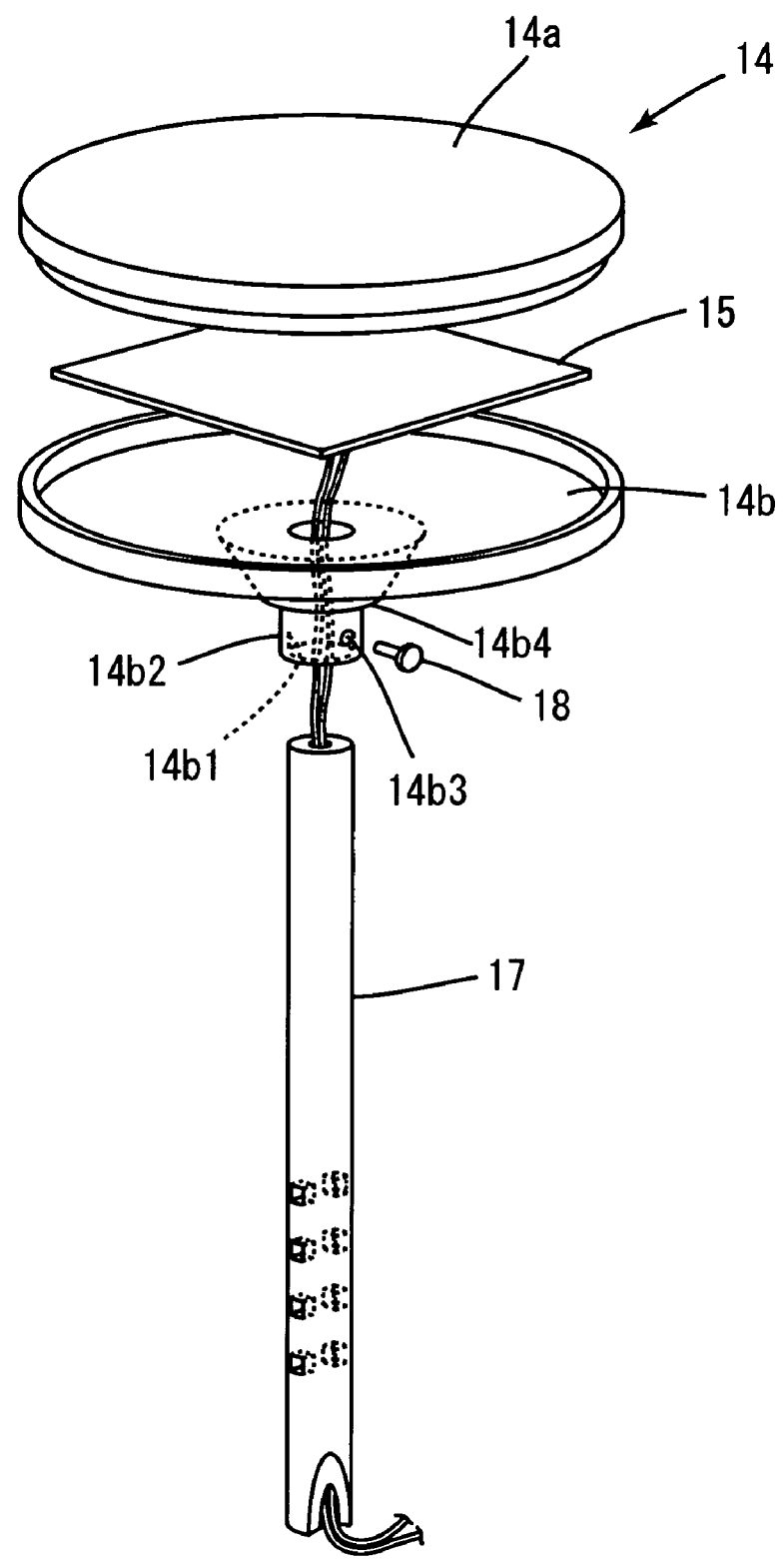
FIG. 3 is a configuration diagram of the smart antenna.

FIG. 3 is a configuration diagram of the smart antenna 10. According to FIG. 3, the smart antenna 10 has an antenna unit 15 with a receiving element 13, the chassis 14 including the receiving element 13 and a shaft portion 17. The shaft portion 17 keeps upward the chassis 14 and the antenna unit 15 contained in chassis 14 far away from the television receiver 20.

A1.1. A Configuration of a Chassis

The chassis 14 is configured for containing the antenna unit 15. The antenna unit 15 is comprised of the receiving element 13 that has directivity for receiving direction of the television broadcasting signals. Therefore, the chassis 14 contains the antenna unit 15 in order to make the receiving direction of the receiving element 13 horizontal. As an example, the chassis 14 contains the antenna unit 15 with making a circuit board that the antenna unit 15 is assembled horizontal. For that purpose, the chassis 14 is formed in a thin cylindrical shape (discoid shape) and is comprised of an upper chassis part 14a and a lower chassis part 14b in order to be capable of horizontally containing the antenna unit 15. And the chassis 14 is made of an insulating material in order to protect the antenna unit 15 from noises from the television receiver 20.

The upper chassis part 14a of the chassis 14 is in a shape whose horizontal cross section is circular and has a recess wherein the antenna unit 15 can be contained. Further, the lower chassis part 14b is in a shape whose horizontal cross section is circular and has a recess wherein the antenna unit 15 can be placed. And the lower chassis part 14b had a trapezoidal portion 14b4 (second portion) in a trapezoidal shape whose longer base is connected to a main part of the chassis 14. A part of the chassis 14 upper than the trapezoidal portion 14b4 corresponds to a first portion. The trapezoidal portion 14b4 has a hole 14b1 that leads-out the wiring 15a (mentioned below) at a center of the horizontal cross section. The antenna unit 15 is held in the chassis 14 by coupling the upper chassis part 14a to the lower chassis part 14b so that the lower chassis part 14b is covered by the upper chassis part 14a, after placing the antenna unit 15 onto the lower chassis part 14b to make the wiring be led-out through the hole 14b1.

A1.2. A Configuration of an Antenna Unit

The antenna unit 15 can electrically switch the directivity during receiving the television broadcasting signals. A configuration of the antenna unit 15 is explained with referencing FIG. 1. For example, the antenna unit 15 is comprised of a 909 interface 12, an antenna controller 11 and the receiving element 13 that can electrically switch the directivity during receiving the television broadcasting signals.

The 909 interface 12, for example, is connected to a 909 interface 21 (mentioned below) of the television receiver 20 through a 909 cable 15a1. The 909 interface 12 communicates with the 909 interface 21 of the television receiver 20 complying with the predetermined communication standard (EIA/CEA-909 e.g.), receives channel information (mentioned below) for controlling the receiving element 13 from the television receiver 20 and outputs the channel information to the antenna controller 11.

The antenna controller 11, for example, is comprised of a control unit 11a. The control unit 11a, for example, is comprised of a CPU 11a1, a RAM 11a2 and ROM 11a3. The CPU 11a1 performs several kinds of operations based on several kinds of control programs for the antenna controller 11 recorded on the ROM 11a3. The RAM 11a2 includes a program extracting area extracting the control programs performed by the CPU 11a1 and a data buffering area buffering data of processing results generated during performing the control programs and input data. The ROM 11a3 stores an operating system program capable of being performed by the CPU 11a1, several kinds of the control programs capable of being performed on the operating system program, data used during performing the control programs and data of processing results computed by the CPU 11a1. A program 200 is recorded on the ROM 11a3 in a computer readable form.

For example, the program 200 makes the antenna controller 11 electrically switch the directivity of the receiving element 13 based on the television broadcasting signals corresponding to physical channel identification numbers included in the channel information acquired by the CPU 11a1. In particular, the antenna controller 11 electrically switches the directivity of the receiving element 13 as an antenna for receiving the television broadcasting signals, based on judgments of the television broadcasting signals corresponding to physical channel identification numbers included in the channel information acquired by the CPU 11a1 that performs the program 200.

A switch unit 11b, for example, switches the directivity of the receiving element 13 based on the control signals input from the antenna controller 11. If the receiving element 13 is selected by the CPU 11a1 that performs the program 200, the switch unit 11b switches the directivity of the receiving element 13 based on the channel information acquired by the CPU 11a1 that performs the program 200.

The receiving element 13 is connected to a tuner 22 of the television receiver 20 through a antenna RF [Radio Frequency] cable and receives the television broadcasting signals based on instructions issued by the CPU 11a1 that performs the program 200. In particular, the receiving element 13 can switch a plurality of the receiving directions (16 directions e.g.) as the directivity. If one of the receiving directions is selected, the receiving element 13 get higher sensitivity of the television broadcasting signals coming from the selected receiving direction higher than that of the television broadcasting signals coming from other receiving directions.

A1.3. A Configuration of a Shaft Portion

The shaft portion 17 is configured to support the chassis 14 and the antenna unit 15 at a position where is upper than the television receiver 20. Further the shaft portion 17, according to the present embodiment, is formed in a tubular shape and houses the 909 cable 15a1 and the antenna RF cable 15a2 as the wiring 15a for connecting to the television receiver 20 when the smart antenna 10 is attached to the television receiver 20. According to this configuration, the 909 cable 15a1 and the antenna RF cable 15a2 become not to be conspicuous and not to harm aesthetic feeling. In addition, the shaft portion 17 is made of an insulating material in order to protect the wiring 15a from the noises from the television receiver 20.

According to the configuration mentioned above, the shaft portion 17 is coupled to a unionizing portion 14b2 extended downward from outline of the hole 14b1 by inserting upper edge of the shaft portion 17 into the unionizing portion 14b2. Then the 909 cable 15a1 and the antenna RF cable 15a2 led out from the antenna unit 15 contained in the chassis 14 through the hole 14b1, are inserted into a hollow center of the shaft portion 17 so as to penetrate the hollow center and are led out from a lower edge of the shaft portion 17 that is not coupled to the chassis 14. And a female threaded hole portion 14b3 penetrating a side wall of the unionizing portion 14b2 is formed in the unionizing portion 14b2. The upper edge of the shaft portion 17 inserted into the unionizing portion 14b2 is fixed by inserting and securing a screw 18 into the female threaded hole portion 14b3.

A2. A Configuration of a Television Receiver

Next, the configuration of the television receiver 20 is explained with referencing FIG. 1. The television receiver 20, for example, is comprised of the 909 interface 21, the tuner 22, a front-end 23, a decoder 24, an OSD [On Screen Display] circuit 27, a remote control receiver 28, a recording unit 29 and a control unit 30. Each of the components mentioned above is contained and placed in a cabinet 20a. And as shown in FIG. 2, the smart antenna 10 mentioned above is fixed by fixing portions 50 formed rear surface of the cabinet 20a.

The television receiver 20 inputs the television broadcasting signals received by the smart antenna 10 and outputs sound and video. Therefore, the television receiver 20 is comprised of a sound output unit 25 and a video display unit 26 for outputting the sound and the video. Further the television receiver 20, for example, has a remote control 40 that is capable of communicating the remote control receiver 28. Each of components of the television receiver 20 is explained below.

The 909 interface 21, for example, is connected with the 909 interface 12 of the smart antenna 10 through the 909 cable 15a1. For example, according to the control signals output by the control unit 30, the 909 interface 21 communicates with the 909 interface 12 of the smart antenna 10 based on the predetermined communication standard (EIA/CEA-909 e.g.). For controlling the smart antenna 10, the 909 interface 21 outputs the channel information e.g. to the smart antenna 10.

The tuner 22, for example, is electrically connected to the receiving element 13 through the antenna RF cable 15a2. The tuner 22 acquires the television broadcasting signals selected by users from a plurality of the television broadcasting signals according to the control signals output by the control unit 30. The tuner 22 outputs the television broadcasting signals selected by users to the front-end 23.

The front-end 23, for example, converts the broadcasting signals input from the tuner 22 into intermediate frequency signals and output the intermediate frequency signals to the decoder 24 according to the control signals input from the control unit 30.

According to the control signals output by the control unit 30, the decoder 24, for example, decodes the intermediate frequency signals and generates sound signals and video signals by executing processes complying with a predetermined format (MPRG-2[Moving Picture Experts Group phase 2] e.g.). Then the decoder 24 outputs the decoded sound signals to the sound output unit 25 and outputs the decoded video signals to the video display unit 26.

The sound output unit 25, for example, is a speaker device, and outputs sounds based on the sound signals input from the decoder 24.

The video display unit 26, for example, is a crystalline liquid display device, and outputs videos based on the video signals input from the decoder 24. The video display unit 26 also outputs the videos whereon OSD signals (mentioned below) output by the OSD [On Screen Display] circuit 27 are superimposed.

According to the control signals output by the control unit 30, the OSD circuit 27, for example, superimpose the OSD signals for displaying OSD at the video display unit 26 onto the video signals input to the video display unit 26 from the decoder 24.

The remote control receiver 28, for example, receives some kinds of signals transmitted by the remote control 40 and outputs some kinds of data based on the signals to the control unit 30.

The remote control 40, for example, is operated by the users and transmits the signals corresponding to operations. In particular, the remote control 40 has channel-keys and channel-up/down-keys that are operated to instruct what channels to receive.

The recording unit 29, for example, is comprised of any of a magnetic recording media, an optical recording media and a semiconductor recording media. In particular, a channel map 29a is recorded by the recording unit 29. The channel map 29a, for example, stores channel information. In particular, the channel map 29a, for example, records virtual channel numbers and physical channel numbers assigned with the channel-keys of the remote control 40, directivity information specifying the receiving directions of the smart antenna 10 and gain information concerning to receiving gain of the smart antenna 10. The information recorded in the channel map 29a, for example, are determined and recorded in the channel map 29a when initial setting of the television receiving system 100 is performed.

The control unit 30, for example, is comprised of a CPU 30a, a RAM 30b and a ROM 30c. The CPU 30a performs several kinds of operations based on several kinds of control programs for the television receiver 20 recorded on the ROM 30c. The RAM 30b includes a program extracting area extracting the control programs performed by the CPU 30a and a data buffering area buffering data of processing results generated during performing the control programs and input data.

The ROM 30c stores an operating system program capable of being performed by the CPU 30a, several kinds of the control programs capable of being performed on the operating system program, data used during performing the control programs and data of processing results computed by the CPU 30a. For example a transmission program 300 is recorded on the ROM 30c in a computer readable form.

The transmission program 300, for example, makes the CPU 30a perform a function for transmitting the channel information to the smart antenna 10 through the 909 interface 21. In particular for example, when one of the channels is selected by user's operations of the channel-keys and the channel-up/down-keys of the remote control 40, the CPU 30a acquires the channel information (the physical channel number, the directivity information and the gain information) corresponding to the selected channel from the channel map 29a recorded by the recording unit 29 and transmits the channel information to the antenna controller 11 of the smart antenna 10 through the 909 interface 21. This leads the smart antenna 10 switches the directivity and receives the selected channel.

A2.1. A Holding Method of a Receiving Portion

Figure 4:
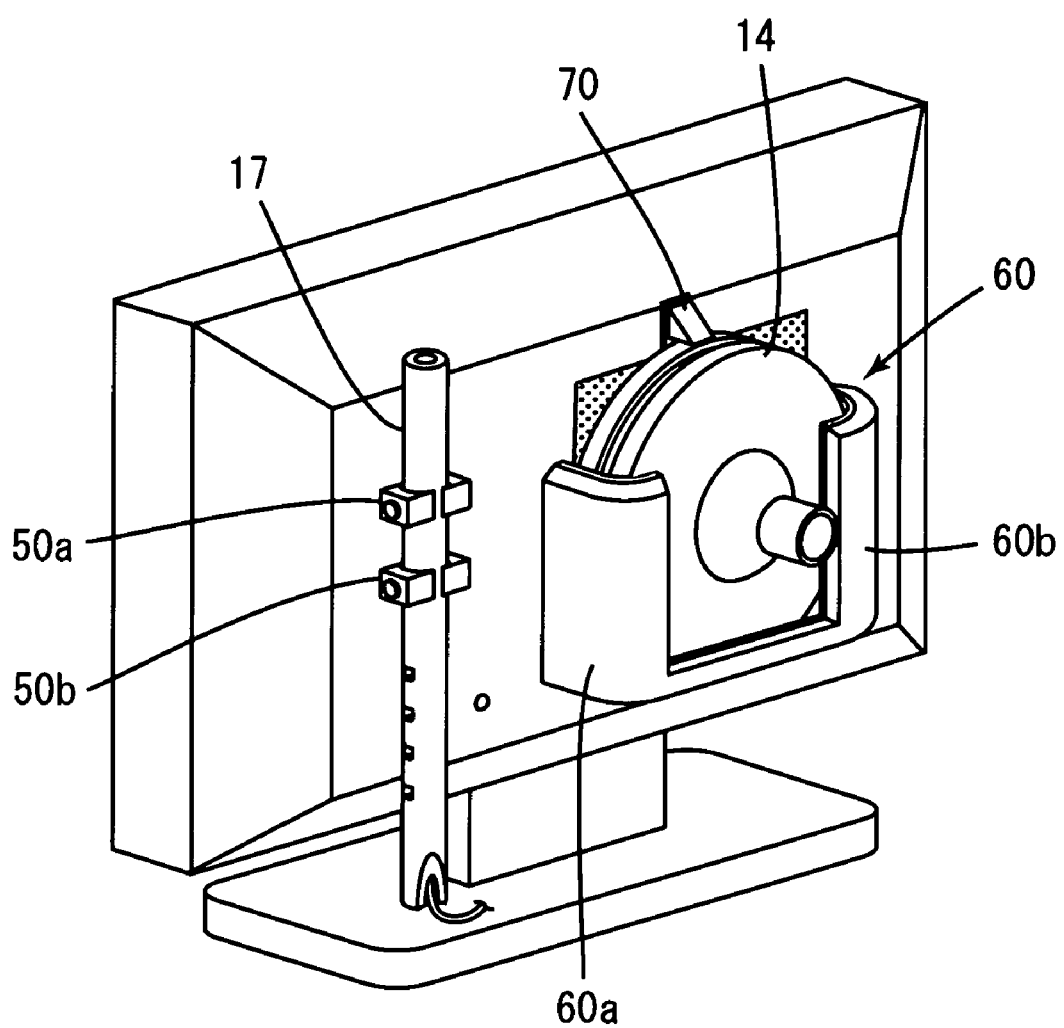
FIG. 4 is a perspective view showing a smart antenna (a receiving unit and a connecting portion) held by the television receiver.
Figure 5:
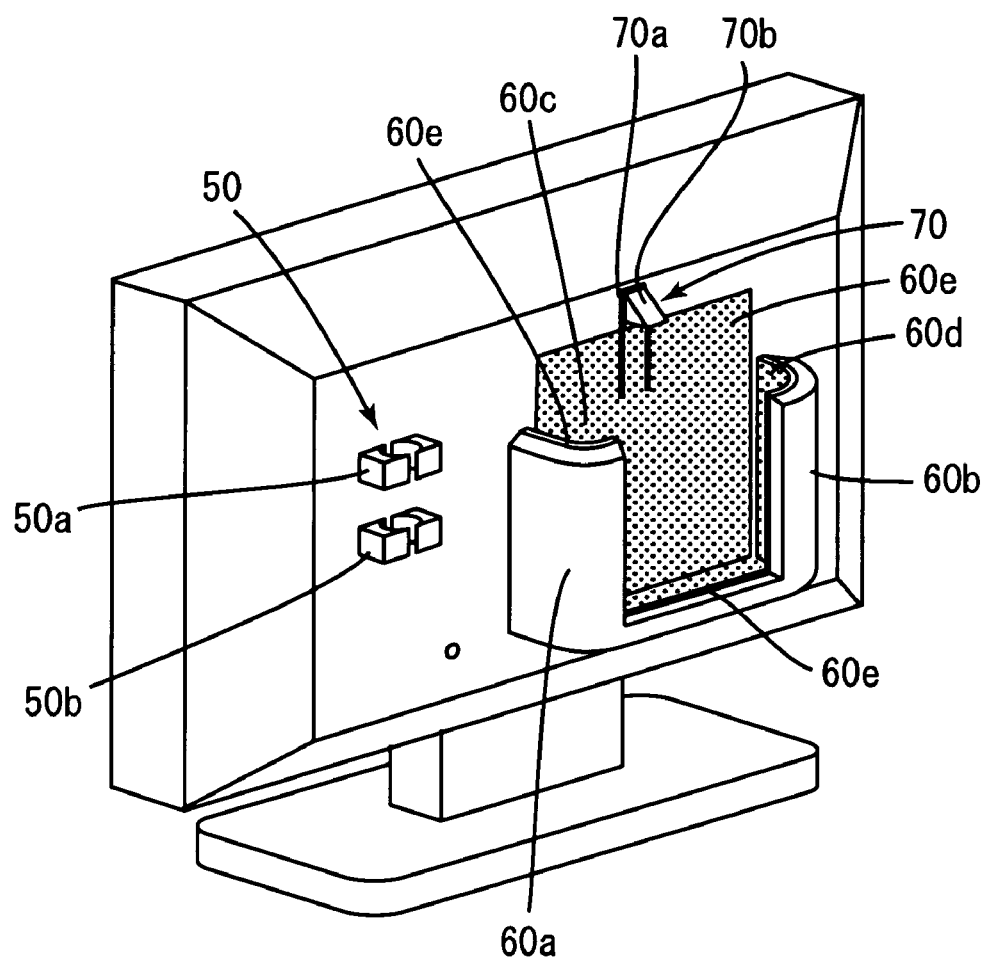
FIG. 5 is a diagram showing a holding portion formed on a rear surface of the television receiver.

FIG. 4 is a diagram showing the chassis 14 (receiving unit) and the shaft portion 17 (connecting portion) held by the television receiver 20. FIG. 5 shows a diagram showing a holding portion 60 formed on the rear surface of the television receiver 20. According to the FIG. 4, the chassis 14 is capable of being held by the holding portion 60, after the chassis 14 is detached from the shaft portion 17. The holding portion 60 has a pair of holding elements 60a and 60b protruded from the rear surface if the television receiver 60. Further, the holding portion 60 has a keeping portion 70 protruded from the rear surface for latching the chassis 14 held by the holding portion 60.

The holding elements 60a and 60b are bent to face and approach their protruded edges each other. A distance between the holding elements 60a and 60b (a length between a root of the holding element 60a and a root of the holding element 60b) is at least larger than a diameter of the chassis 14. Each of holding spaces 60c and 60d are formed between each of the holding elements 60a, 60b and the rear surface of the television receiver. The circumference of the chassis 14 can be inserted into the holding spaces 60c and 60d.

Figure 6:
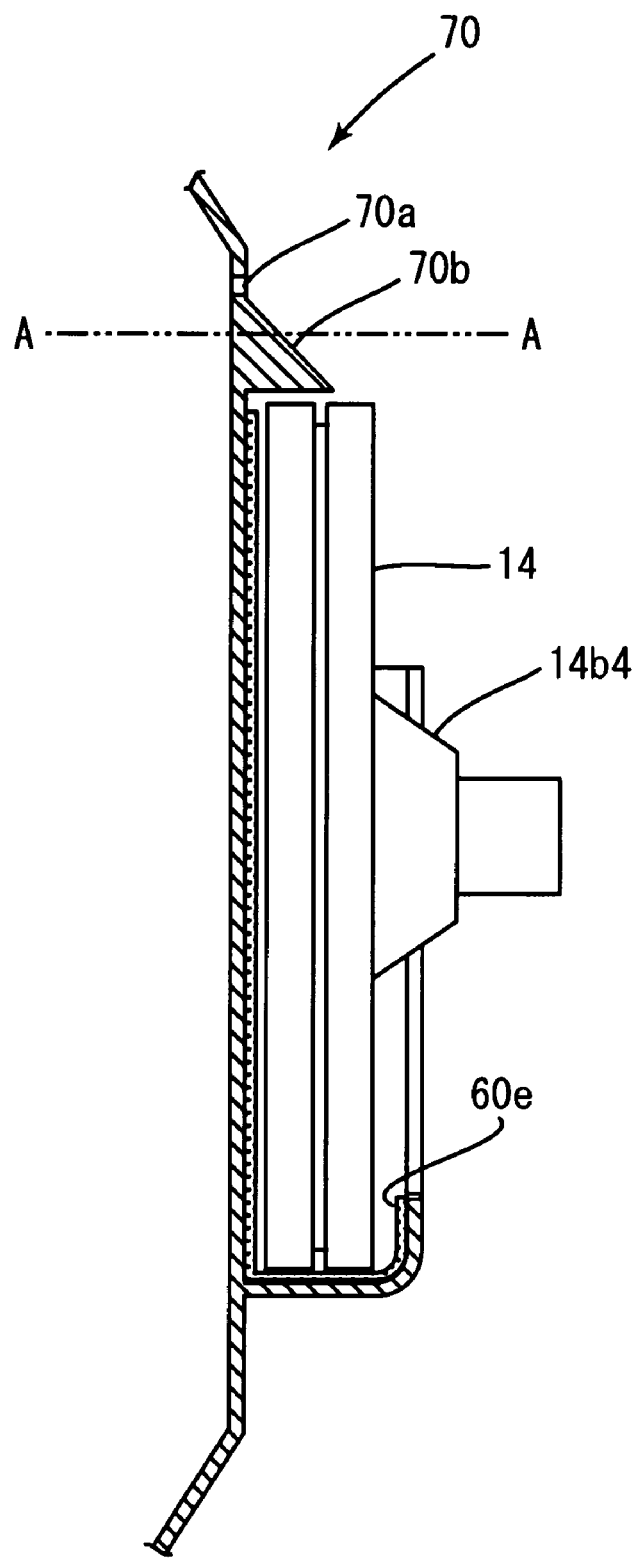
FIG. 6 is a cross sectional view of a keeping portion.

Further, a cushioning material 60e is attached on interfaces between the holding spaces 60c and the holding elements 60a, between the holding spaces 60c and the rear surface of the television receiver, between the holding spaces 60d and the holding elements 60b and between the holding spaces 60d and the rear surface of the television receiver. In particular, the cushioning material 60e is attached by adhering or coating the cushioning material 60e on the interfaces. The circumference of the chassis 14 inserted into the holding spaces 60c and 60d touches the cushioning material 60e. The cushioning material 60e performs to protects the chassis 14 held by the holding portion 60 because the cushioning material 60e is made of a bonded material or a resin having elasticity FIG. 6 is a cross sectional view showing a configuration of a keeping portion 70. FIG. 6 is a side view showing vertical cross section of rear side of the television receiver 20. The keeping portion 70 is formed in order to latch the chassis 14 held by the holding portion 60. The keeping portion 70 has a hook 70b whose side view is triangle. The hook 70b protrudes to rear side from the rear surface of the cabinet 20a. As shown in FIG. 2 and FIG. 5, a U-shaped cutting 70a is formed around the hook 70b. The U-shaped cutting 70a separates the hook 70b from the rear surface of the cabinet 20a in both side directions and upper directions. The hook 70b is connected to the rear surface of the cabinet 20a just in lower direction.

Therefore, the hook 70b can generate a reactive elastic force along A-A direction (shown in FIG. 6) perpendicular to the rear surface of the cabinet 20a. And the hook 70 has a slope that is slanting perpendicular to upper-rear direction. In addition, as a configuration for making the hook 70b generate the reactive elastic force, a method using a spring can be applied.

A method for holding the chassis 14 by in the holding portion 60 is explained below. First, the circumference of the chassis 14 is started being inserted into the holding spaces 60c and 60d, with making the upper plane of the chassis 14 face to the rear surface of the television receiver 20 and with making the thickness direction of the chassis 14 same as front-rear direction of the television receiver 20. Then, the upper plane of the chassis 14 pushes the hook 70b to front side. Further, the circumference of the chassis 14 is continued to be inserted into the spaces 60c and 60d until the lowest portion of the chassis 14 reaches a bottom of the spaces 60c and 60d.

Then, the hook 70b is freed from being pushed by the upper plane of the chassis 14 and the hook 70b is protruding to rear side again by the reactive elastic force of the hook 70b. Therefore, an upward movement of the chassis 14 is prevented by the hook 70b and the chassis 14 is held by the holding portion 60.

A method for holding the shaft portion 17 is explained below. According to FIG. 4, the shaft portion 17 is connected to the television receiver 20 with being fixed by the fixing portion 50 (a connector holder) when the smart antenna 10 is used. In particular, the fixing portion 50 is comprised of two pair of fixing bosses 50a and 50b protruded to rear side from the rear surface of the television receiver 20. The shaft portion 17 is fixed by being nipped by the fixing bosses 50a and 50b. The shaft portion 17 detached from the chassis 14 can be slide below until the top edge of the shaft portion 17 gets lower than a top plane of the television receiver 20. According this configuration, the shaft portion 17 is contained by the television receiver 20.

The method for holding the shaft portion 17 should not be recognized to be limited to the method mentioned above. For example, it is possible that the shaft portion 17 detached from the chassis 14, rotates to make the top edge of the shaft portion 17 get lower than the top plane of the television receiver 20.

A2.2. Another Embodiment

Figure 7:
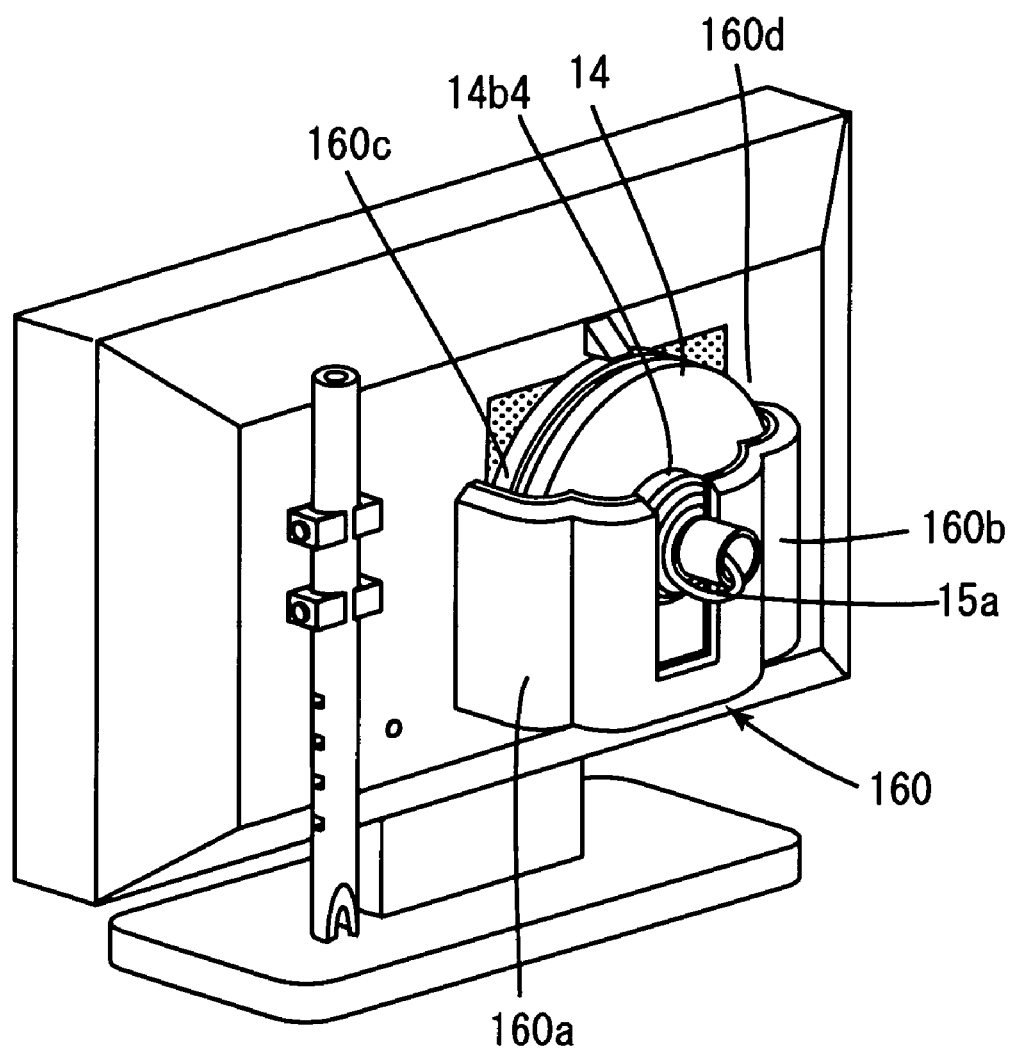
FIG. 7 is a diagram showing a chassis held by the holding portion of another embodiment.

The configurations of the holding elements 60a and 60b can be modified in a manner to be described below. FIG. 7 is a diagram showing the chassis 14 held by a holding portion 160 of this embodiment. In this embodiment, the chassis 14 and the cables 15a1 and 15a2 led out from the antenna unit can be held by the holding portion 160. The smart antenna of this embodiment is identical to the smart antenna 10 of the previous embodiment.

According to FIG. 7, holding elements 160a and 160b are protruded from the television receiver 20. The holding elements 160a and 160b are bent to face and approach their protruded edges each other. Bent portions of the holding elements 160a and 160b are extended more than that of the previous embodiment shown in FIG. 4. The bent portions of the holding elements 160a and 160b are formed in shapes bent along a surface of the trapezoidal portion 14b4. The cables 15a1 and 15a2 are coiled along the surface of the trapezoidal portion 14b4 as shown in FIG. 7. The chassis 14 and the cables 15a1 and 15a2 are inserted in to holding spaces 160c and 160d formed between the rear surface of the television receiver 20 and each of the holding elements. The holding spaces 160c and 160d can contain the chassis 14 including the trapezoidal portion 14b4 with the cables 15a1 and 15a2. The cables 15a1 and 15a2 can be covered by the holding elements 160a and 160b. Therefore, the cables 15a1 and 15a2 can be protected from breaking e.g.

Figure 8:
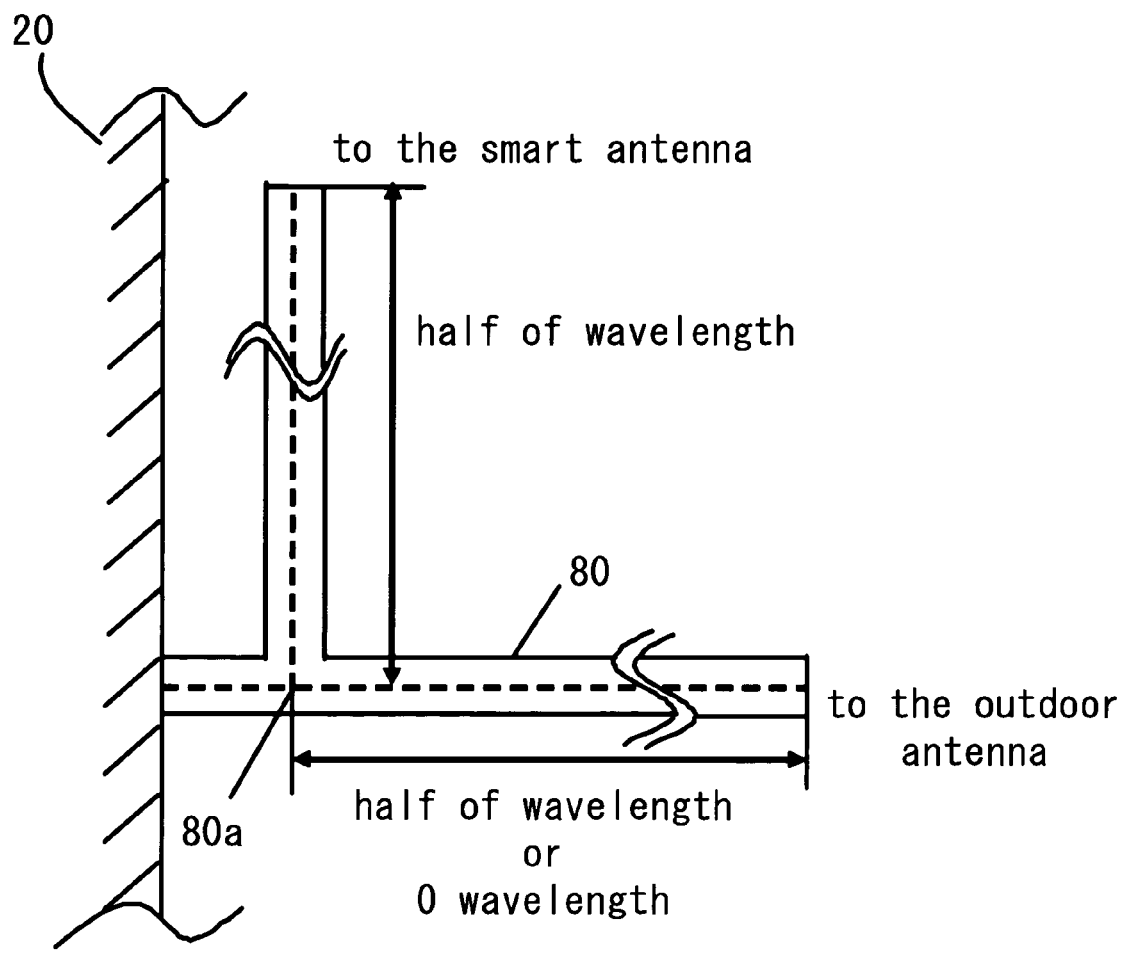
FIG. 8 is a side view of the television receiving system of another embodiment; and, FIG. 9 is a perspective view showing a smart antenna of related art.
Figure 9:
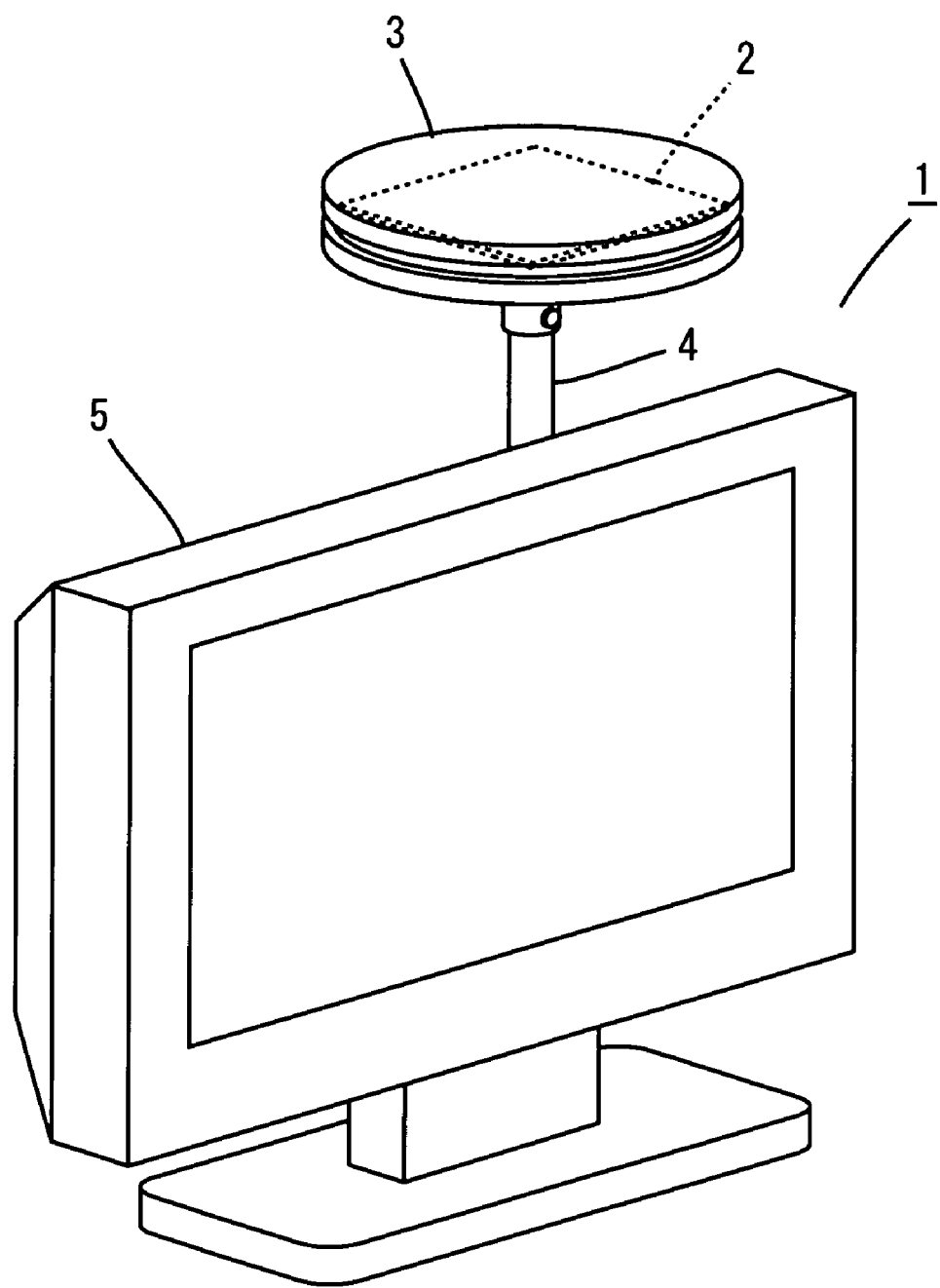

In case the smart antenna and an outdoor antenna are alternatively used, an attaching method shown in FIG. 8 can be applied. A television receiver 120 is connected to the smart antenna or the outdoor antenna through a coaxial-cable 80. The coaxial-cable 80 has a branch point 80a and branched into two branches at the branch point 80. Each terminal of the branches is capable of connecting to each of the smart antenna and the outdoor antenna. The length of each of the branches is same as a half wavelength of the television broadcasting signals or zero. The half wavelength can be half of a center wavelength of the television broadcasting signals.

According to the configuration mentioned above, in case the smart antenna is connected to the terminal of one branch and the terminal of another branch is opened, an impedance at the branch point 80a reaches an infinite value. Therefore, baleful influences by radio waves received by the smart antenna and leaked into another branch, can be ignored. Consequently, impedance matching can be easily achieved. And, in case the outdoor antenna is connected to the terminal of another branch and the terminal of one branch is opened, impedance matching can be easily achieved for a same reason.

B. Summary of the Embodiments

As described above, the television receiving system 100 is comprised of the television receiver 20 and the smart antenna 10 capable of being divided into the chassis 14 and shaft portion 17. Further, the television receiver 20 has a holding portion 60 for holding the chassis 14. The holding portion 60 holds the chassis 14 detached from the shaft portion 17 with making the thickness direction of the chassis 14 same as front-rear direction of the television receiver 20. Therefore, the smart antenna 10 can be easily stored when the smart antenna 10 is not in use.

The smart antenna is comprised of the receiving unit and the connecting portion. The receiving unit and the connecting portion are detachable each other. And the television receiver has the holding portion capable of holding the receiving unit.

Therefore, in case the smart antenna is not in use, the receiving unit is detached from the connecting portion and is held by the holding portion. Consequently, the smart antenna can be stored by the television receiver when the smart antenna is not used.

An example of a particular aspect of the present invention discloses a television receiving system, wherein: the receiving unit has an antenna unit that receives the television broadcasting signals; the receiving unit has a chassis; the chassis has a first portion formed in a discoid shape and a second portion formed in a trapezoidal shape whose longer base is connected to the first portion; and the holding portion holds the receiving unit to make a thickness direction of the first portion same as a front-rear direction of the television receiver.

According to the configuration mentioned above, the concrete shape of the smart antenna is configured in a manner to be described below. That is, the smart antenna is comprised of the antenna unit that receives the television broadcasting signals and the chassis. The chassis is comprised of the first portion formed in a discoid shape and the second portion formed in a trapezoidal shape. The holding portion holds the receiving unit to make a thickness direction of the first portion same as a front-rear direction of the television receiver. Therefore, the television receiver can compactly store the smart antenna without any bulge in the thickness direction because the holding portion holds the receiving unit to make a thickness direction of the first portion same as a front-rear direction of the television receiver. Therefore, a merit of the television receiver with thin thickness is not harmed.

And a particular configuration of the holding portion discloses a television receiving system, wherein: the holding portion has a pair of holding elements that are protruding from the rear surface to form a holding spaces between the rear surface and the holding element; and a circumference of the first portion is inserted into the holding spaces.

According to the configuration mentioned above, the holding portion forms the holding spaces between the rear surface and the holding elements. It is possible that the holding portion can hold the receiving unit by a small numbers of parts. And it is possible not to make the receiving unit annoyance, because the receiving unit is inserted into the holding spaces.

Further, cables connecting to the television receiver and the smart antenna have to be also stored when the receiving unit is stored. For that purpose, an optional aspect of the present invention discloses a television receiving system, wherein: the receiving unit has a cable for electrically connecting the receiving unit to the television receiver; the holding portion has a pair of holding elements that are protruding from the rear surface to form holding spaces between the rear surface and the holding elements; and a circumference of the first portion and the cable coiling around the second portion are inserted into the holding spaces.

According to the configuration mentioned above, the receiving unit is held with coiling the cable around the second portion. The holding spaces that can contain the receiving unit with the cable coiled around the second portion, are formed in the holding portion. It is possible to prevent the cable from being broken by hooking into something when moving the television receiver, because the cable is contained in the holding portion. Further, the appearance of the television receiver holding the receiving unit can be slimmed-down.

The antenna unit have to be protected from impacts coming from outside, because some circuits such like a CPU e.g. are assembled to the antenna unit. Therefore, preferable aspect of the present invention discloses a television receiving system, wherein: a cushioning material is attached on an interface between the holding space and the rear surface and between the holding space and each of the holding elements.

According to the configuration mentioned above, the cushioning material is attached on the surface of the holding space. As an example of the cushioning material, one of a bonded material and a resin having elasticity e.g. is applicable. The receiving unit held by the holding portion is protected from scratches and damages because the holding portion is protected by the cushioning material.

To hold the receiving portion steady, a preferable aspect of the present invention discloses a television receiving system, wherein: a keeping portion is protruded from the rear surface for latching the receiving unit inserted into the holding spaces.

According to the configuration mentioned above, the receiving unit inserted into the holding spaces is latched by the keeping portion. Therefore, in case the television receiver is a portable device, the keeping portion can prevent the receiving unit from jumping out from the holding portion.

Further, a configuration that the connecting portion detached from the receiving portion can be applied. Therefore, a preferable aspect of the present invention discloses a television receiving system, wherein: the television receiver has a connector holder that holds the connecting portion detached from the television receiver and the receiving unit.

According to the configuration mentioned above, the receiving unit is held by the holding portion and the shaft portion is held by the connector holder, after the smart antenna is dismounted into the receiving unit and the shaft portion. Therefore, the television receiving system detached the smart antenna can be compact. Here, as an example of a method for holding the connecting portion, a method that the connecting portion is vertically held and a method that the connecting portion is folded, if the connecting portion is formed in a axial shape.

A detailed aspect of the present invention discloses a television receiving system, wherein: the receiving unit has an antenna unit that receives the television broadcasting signals; the receiving unit has a chassis; the chassis has a first portion formed in a discoid shape and a second portion formed in a trapezoidal shape whose longer base is connected to the first portion; the holding portion holds the receiving unit to make a thickness direction of the first portion same as a front-rear direction of the television receiver; the holding portion has a pair of holding elements that are protruding from the rear surface to form a holding spaces between the rear surface and each of the holding elements; a circumference of the first portion is inserted into the holding spaces; a cushioning material is attached on an interface between the holding space and the rear surface and between the holding space and each of the holding elements; a keeping portion is protruded from the rear surface for latching the receiving unit inserted into the holding spaces; and the television receiver has a connector holder that holds the connecting portion detached from the television receiver and the receiving unit.

While the invention has been particularly shown and described with respect to preferred embodiments thereof, it should be understood by those skilled in the art that the foregoing and other changes in form and detail may be made therein without departing from the sprit and scope of the invention as defined in the appended claims.

It is to be understood that the present invention is not limited to the embodiments as described above, and that variances described below shall be considered as embodiments disclosed in the present invention.

A variance in which any of the members disclosed in one of the embodiments are appropriately combined with any of those disclosed in the other embodiments and exchangeable with the members.

A variance in which the members and structures disclosed in the embodiments are appropriately exchanged with those disclosed in related arts but not disclosed in the embodiments or appropriately combined with one another.

A variance in which the members and structures disclosed in the embodiments are appropriately exchanged with those thought to be substitutes by a person with ordinary skill in the art but not disclosed in the embodiments, and appropriately combined with one another.

This invention is of course not limited to the above aspects. While of course evident to a practitioner of the art, also disclosed as aspects of the invention are the modification and application of appropriate combinations of mutually substitutable members, configurations and similar, disclosed in the above aspects; the modification and application of appropriate combinations of mutually substitutable members, configurations and similar, which, though not disclosed in the above aspects, employ widely-known technology; and, the modification and application of appropriate combinations of mutually substitutable members, configurations and similar, which, though not disclosed in the above aspects, can be performed by a practitioner of the art based on widely-known technology.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A television receiving system, comprising:
   a smart antenna having a receiving unit that electrically switches directions for receiving television broadcasting signals and a connecting portion that is detachably coupled with the receiving unit; and
   a television receiver coupled with the receiving unit though the connecting portion and having a holding portion that holds the receiving unit detached from the connecting portion on a rear surface of the television receiver, which is opposite to a front surface displaying videos, wherein:
   the receiving unit has an antenna unit that receives the television broadcasting signals;
   the receiving unit has a chassis;
   the chassis has a first portion formed in a discoid shape and a second portion formed in a trapezoidal shape whose longer base is connected to the first portion;
   the holding portion holds the receiving unit to make a thickness direction of the first portion same as a front-rear direction of the television receiver;
   the holding portion has a pair of holding elements that are protruding from the rear surface to form a holding spaces between the rear surface and the holding elements; and
   a circumference of the first portion is inserted into the holding spaces.

2. A television receiving system as set forth claim 1, wherein:
   the receiving unit has a cable for electrically connecting the receiving unit to the television receiver;
   the holding portion has a pair of holding elements that are protruding from the rear surface to form holding spaces between the rear surface and the holding elements; and
   a circumference of the first portion and the cable coiling around the second portion are inserted into the holding spaces.

3. A television receiving system as set forth claim 1, wherein:

a cushioning material is attached on an interface between the holding spaces and the rear surface and between the holding spaces and each of the holding elements.

4. A television receiving system as set forth claim 1, wherein:

a keeping portion is protruded from the rear surface for latching the receiving unit inserted into the holding spaces.

5. A television receiving system as set forth claim 1, wherein:

the television receiver has a connector holder that holds the connecting portion detached from the television receiver and the receiving unit.

6. A television receiving system as set forth claim 1, wherein:

the receiving unit has an antenna unit that receives the television broadcasting signals;

the receiving unit has a chassis;

the chassis has a first portion formed in a discoid shape and a second portion formed in a trapezoidal shape whose longer base is connected to the first portion;

the holding portion holds the receiving unit to make a thickness direction of the first portion same as a front-rear direction of the television receiver;

the holding portion has a pair of holding elements that are protruding from the rear surface to form holding spaces between the rear surface and each of the holding elements;

a circumference of the first portion is inserted into the holding spaces;

a cushioning material is attached on an interface between the holding spaces and the rear surface and between the holding spaces and each of the holding elements;

a keeping portion is protruded from the rear surface for latching the receiving unit inserted into the holding spaces; and the television receiver has a connector holder that holds the connecting portion detached from the television receiver and the receiving unit.

* * * * *